(12) United States Patent
Hwang et al.

(10) Patent No.: US 6,720,993 B1
(45) Date of Patent: Apr. 13, 2004

(54) APPARATUS AND METHOD FOR EXPANDING DYNAMIC RANGE IN IMAGE PROCESSING SYSTEM

(75) Inventors: Jung-hyun Hwang, Seongnam (KR); Kwang-ho Heo, Suwon (KR)

(73) Assignee: Samsung Electronics Co., Ltd. (KR)

( * ) Notice: Subject to any disclaimer, the term of this patent is extended or adjusted under 35 U.S.C. 154(b) by 633 days.

(21) Appl. No.: 09/679,699

(22) Filed: Oct. 5, 2000

(30) Foreign Application Priority Data

Oct. 5, 1999 (KR) ........................................ 1999-42876

(51) Int. Cl.[7] .............................................. H04N 5/228
(52) U.S. Cl. .................................................. 348/208.13
(58) Field of Search ................................ 348/154, 155, 348/208.16, 208.12, 208.13, 208.14, 416.1, 699, 296, 221.1, 222.1, 227.1, 229.1, 230.1, 362–364; 375/240.16; 382/236, 238, 224

(56) References Cited

U.S. PATENT DOCUMENTS

| | | | |
|---|---|---|---|
| 5,144,442 A | * 9/1992 | Ginosar et al. | 348/222.1 |
| 5,440,399 A | * 8/1995 | Lee | 358/300 |
| 5,517,242 A | * 5/1996 | Yamada et al. | 348/254 |
| 5,602,588 A | * 2/1997 | Kusaka et al. | 348/264 |
| 5,638,119 A | * 6/1997 | Cornuejols | 348/229.1 |
| 6,204,881 B1 | * 3/2001 | Ikeda et al. | 348/362 |
| 6,418,245 B1 | * 7/2002 | Udagawa | 382/312 |
| 6,654,062 B1 | * 11/2003 | Numata et al. | 348/362 |
| 2003/0030728 A1 | * 2/2003 | Kudo | 348/208.6 |
| 2003/0133035 A1 | * 7/2003 | Hatano | 348/362 |

FOREIGN PATENT DOCUMENTS

JP 2002125240 A * 4/2002 ............ H04N/9/07

* cited by examiner

Primary Examiner—Vu Le
Assistant Examiner—Yogesh Kumar Aggarwal
(74) Attorney, Agent, or Firm—Mills & Onello LLP

(57) ABSTRACT

A dynamic range expanding apparatus in an image processing system, capable of more stably expanding dynamic visual range by removing motion blurring caused when images each having different exposure levels are combined, and a dynamic range expanding method, are provided. In this apparatus, a video multiplexing unit divides a digital video signal, which is converted from an analog video signal output by a charged coupled device, into an over-exposed video signal and an under-exposed video signal having different exposure levels. A motion correction unit corrects the moving part of an excessively-exposed video according to the amount of movement of an image acquired by the charged coupled device, using the output of the video multiplexing unit. A video output unit interpolates a dark part of a resultant signal corrected by the motion correction unit and a bright part of the under-exposed video signal using a luminance weight produced from the under-exposed video signal, and outputs the interpolated result as an expanded video signal having an expanded dynamic range.

14 Claims, 8 Drawing Sheets

APPARATUS AND METHOD FOR EXPANDING DYNAMIC RANGE IN IMAGE PROCESSING SYSTEM

BACKGROUND OF THE INVENTION

1. Field of the Invention

The present invention relates to an image processing system for processing image signals, and more particularly, to an apparatus and method for expanding the dynamic range of a digital image signal in an image processing system.

2. Description of the Related Art

In image signal processing, much research has been conducted into reproducing an image taken by a camera to be close to the visual characteristics of a human being. The viewing range that a human being can perceive from a bright place to a dark place, that is, the dynamic range, is only about 120 dB. However, the dynamic range of an image processed by a general image processing system using a charge coupled device (CCD) is only about 60 db. Consequently, it is very difficult to obtain the same sensitivity as human vision from an image in which dark and bright luminance levels are mixed. Thus, the dynamic range of an image is expanded to overcome this problem.

U.S. Pat. No. 5,144,442 discloses one of the above-described conventional dynamic range expanding approaches for expanding the dynamic range of video. The disclosed conventional dynamic range expanding apparatus selects good-state parts from each video having a plurality of different exposure levels, and applies neighborhood transforms to the selected good-state parts, thereby expanding the dynamic range of a video. Here, the neighborhood transform is a type of image enhancement filtering. However, the above-described conventional dynamic range expanding apparatus must include a plurality of CCDs to simultaneously acquire a plurality of different videos.

In another conventional dynamic range expanding method used to address the problem, video signals having different exposure levels, which are adjacent to each other in terms of time, are combined. However, in this conventional dynamic range expanding method, in the case when an object included in an acquired image moves fast, when the images having different exposure levels are combined, the spacial positions of the objects in the images are mismatched. Therefore, the combined images are blurred. In order to solve this problem, a fast CCD capable of taking an image rapidly is required, but it is not easy to realize such a fast CCD in an image processing system using a camera.

SUMMARY OF THE INVENTION

An object of the present invention is to provide a dynamic range expanding apparatus capable of more stably expanding the dynamic range by removing motion blurring caused when images having different exposure levels are combined.

Another object of the present invention is to provide a dynamic range expanding method which is performed by the dynamic range expanding apparatus of an image processing system.

In one aspect, the present invention provides a dynamic range expanding apparatus in an image processing system for converting an analog video signal output from a charge coupled device into a digital video signal and expanding the dynamic range of the digital video signal. The apparatus of the invention includes a video multiplexing unit for dividing the digital video signal into an over-exposed video signal and an under-exposed video signal having different exposure levels. A motion correction unit corrects the moving part of an excessively-exposed video according to the amount of movement of an image acquired by the charged coupled device, using the output of the video multiplexing unit. A video output unit interpolates a dark part of a resultant signal corrected by the motion correction unit and a bright part of the under-exposed video signal using a luminance weight produced from the under-exposed video signal. The video output unit outputs the interpolated result as an expanded video signal having an expanded dynamic range.

The present invention also provides a dynamic range expanding method in an image processing system for converting an analog video signal output from a charge coupled device into a digital video signal and expanding the dynamic range of the digital video signal. In accordance with the method of the invention, the digital video signal is divided into an over-exposed video signal and an under-exposed video signal having different exposure levels. The moving part of an excessively-exposed video is corrected according to the amount of movement of an image acquired by the charged coupled device. A dark part of a resultant signal corrected in the motion correcting step and a bright part of the under-exposed video signal are interpolated using a luminance weight produced from the under-exposed video signal to determine the interpolated result as an expanded video signal having an expanded dynamic range.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DESCRIPTION OF PREFERRED EMBODIMENTS OF THE INVENTION

Figure 1:
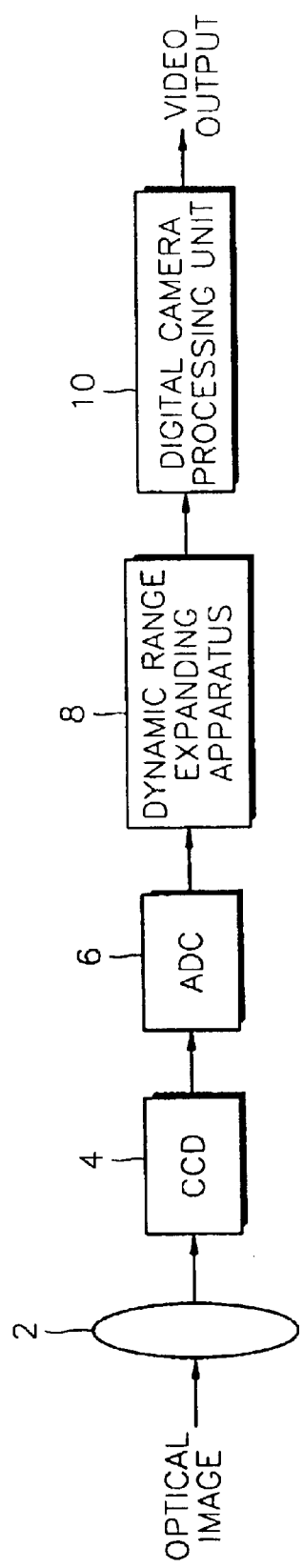
FIG. 1 is a schematic block diagram of an image processing system illustrating a dynamic range expanding apparatus, according to one embodiment of the present invention.

Referring to FIG. 1, an image processing system according to an embodiment of the invention includes a lens 2, a charge coupled device (CCD) 4, an analog-to-digital converter (ADC) 6, a dynamic range expanding apparatus 8 according to the present invention, and a digital camera processing unit 10.

The CCD 4 acquires an optical image received via the lens 2 in two exposure states, converts the acquired image into an analog video signal, and outputs the analog video signal to the ADC 6. That is, the CCD 4 alternates between acquiring an image at over-exposed and under-exposed states on a field-by-field basis. Therefore, the images of fields that are adjacent to each other in terms of time have different exposure levels.

The ADC 6 converts the received analog video signal into a digital video signal to output the digital video signal to the dynamic range expanding apparatus 8 according to the present invention. Here, the lens 2, the CCD 4 and the ADC 6 are included in a pre-processor. The dynamic range expanding apparatus 8 according to the present invention expands the dynamic range of a digital video signal as described below, and outputs an expanded video signal having an expanded dynamic range to the digital camera processing unit 10. The digital camera processing unit 10 performs gamma correction and video encoding on the expanded video signal, and then outputs the result as a video output signal VIDEO OUTPUT to be used as an image. Alternatively, the VIDEO OUTPUT signal can be output to a recording medium or the like.

Figure 2:
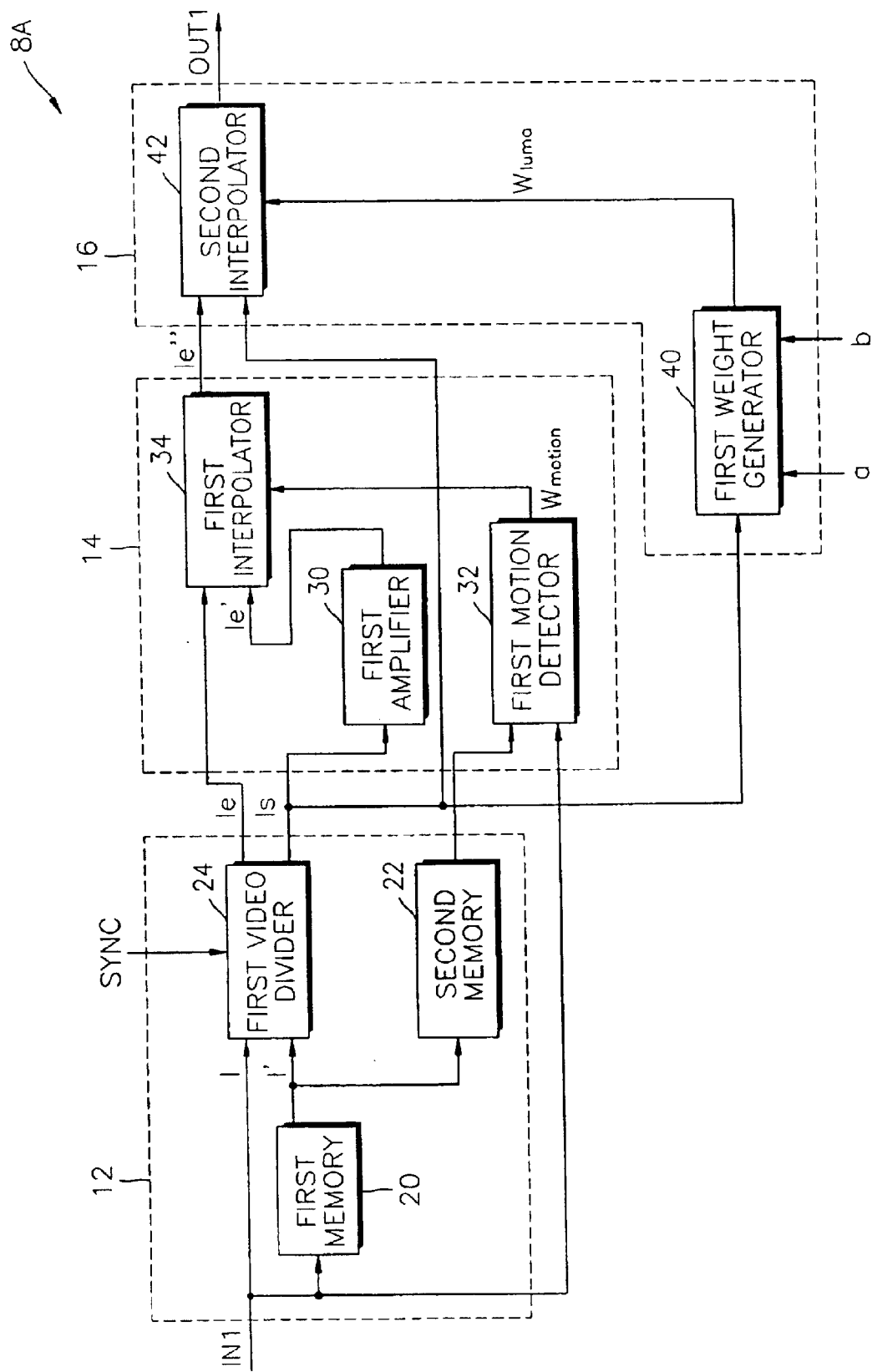
FIG. 2 is a block diagram of one embodiment of the dynamic range expanding apparatus shown in FIG. 1, in accordance with the present invention.

FIG. 2 is a block diagram of an embodiment 8A of the dynamic range expanding apparatus 8 shown in FIG. 1 in accordance with the present invention. The dynamic range expanding apparatus 8A includes a video multiplexing unit 12, a motion correction unit 14 and a video output unit 16.

The video multiplexing unit 12 divides the digital video signal I received via an input port IN1 into video signals Ie and Is having different exposure levels. Here, the CCD 4 acquires an image by varying the exposure state at each field as described above, so that the digital video signal received via the input port IN1 also has alternating different exposure levels on a field-by-field basis. Hereinafter, a digital video signal of an image acquired by the CCD 4 in an excessively-exposed state is referred to as an over-exposed video signal Ie, and a digital video signal of an image acquired by the CCD 4 in an under-exposed state is referred to as an under-exposed video signal Is.

The video multiplexing unit 12 includes a first video divider 24 and first and second memories 20 and 22. The first video divider 24 divides the digital video signal I into an over-exposed video signal Ie and an under-exposed video signal Is in response to a field or frame synchronous signal SYNC. The first memory 20 stores the digital video signal I in units of a predetermined number of fields. The second memory 22 stores the result stored in the first memory 20 in units of a predetermined number of fields. For example, when the first video divider 24 divides the digital video signal I in response to a field synchronous signal SYNC, each of the first and second memories 20 and 22 stores a digital video signal on a field-by-field basis. On the other hand, when the first video divider 24 divides the digital video signal I in response to a frame synchronous signal SYNC, each of the first and second memories 20 and 22 stores a digital video signal on a frame (two fields)-by-frame basis.

When the positions of objects on images acquired at over-exposed and under-exposed states are not consistent with each other due to movement of an object and shaking of the camera, the image is badly distorted at a portion where the positions of the objects are inconsistent, thus becoming significantly unstable. Hence, in order to preserve the consistency between object movements where much movement occurs, an expanded video signal having an expanded dynamic range must be obtained from a digital video signal which is received through the same field, that is, through only odd-numbered fields or only even-numbered fields. That is, the expanded video signal must be determined by a video signal having an over-exposed level or an under-exposed level. In this case, as the difference in exposure level between fields becomes larger, the movement is perceived to be smoother, but a flickering image having a brightness that varies widely may be formed. Thus, the present invention provides the motion correction unit 14 to form an image having a narrow variation in brightness over the entire area while smoothing the motion.

The motion correction unit 14 shown in FIG. 2 corrects the motion part of an overly-exposed image using the output signals Ie and Is of the video multiplexing part 12 and the digital video signal I, according to the amount of movement of an image acquired by the CCD 4, and outputs a corrected result Ie" to the video output unit 16.

In order to achieve this, the motion correction unit 14 includes a first amplifier 30, a first motion detector 32 and a first interpolator 34. The first amplifier 30 amplifies the under-exposed video signal Is output by the first video divider 24 at a predetermined value ($\alpha$) expressed by the following Equation 1, and outputs an amplified signal Ie' to the first interpolator 34.

$$Ie' = \alpha Is \tag{1}$$

wherein $\alpha$ denotes the average magnification ratio of an over-exposed video signal to an under-exposed video signal expressed by Equation 2:

$$\alpha = \frac{\sum_{(x,y)} i'_e(x, y)}{\sum_{(x,y)} i'_s(x, y)} \tag{2}$$

That is, the under-exposed video signal Is having an exposure level digitally expanded by the first amplifier 30 is approximately the same as the over-exposed video signal Ie.

The first motion detector 32 detects a first motion weight [Wmotion(x,y)] which corresponds to the amount of movement of an image, from the output [I(x,y,t−2)] of the second memory 22 and the digital video signal [I(x,y,t)], the first motion weight expressed by Equation 3:

$$Wmotion(x,y) = \beta 1 * |I(x,y,t-2) - I(x,y,t)| \tag{3}$$

wherein a first predetermined gain $\beta 1$ is a specific constant for normalizing the first motion weight [Wmotion(x,y)]. That is, the first motion detector 32 obtains a first motion weight Wmotion using the temporal differentiation of a digital video signal with respect to an image picked up at the same exposure state, as can be seen from Equation 3.

The first interpolator 34 interpolates the amplified signal Ie' from the first amplifier 30 and the over-exposed video signal Ie according to the first motion weight [Wmotion(x, y)] defined in Equation 3, and outputs the result Ie" of the interpolation to the video output unit 16, the interpolation result Ie" being expressed by Equation 4:

$$Ie''=(1.0-Wmotion)*Ie+Wmotion*Ie' \quad (4)$$

wherein a first motion weight Wmotion is equal to or greater than 0 and less than 1, is a function of the amount of movement of a pixel, and is generally proportional to the amount of movement of a pixel. Here, the amount of movement of a pixel can be classified into a variation in image intensity or luminance due to the movement between fields with respect to the entire image, and a variation in image intensity due to the movement of an independent object existing within an image. Here, the dynamic range expanding apparatus according to the present invention can use only one among the above-described two movement amounts or both of them. However, the movement between fields with respect to the entire image can be generally corrected by the first motion weight Wmotion of the first motion detector 32 for preventing hand jitter, so that the present invention focuses on the movement of an independent object.

Meanwhile, a expressed in Equation 2 is determined to amplify the level of the under-exposed video signal Is to the level of the over-exposed video signal Ie. Thus, the amplified signal Ie' output by the first amplifier 30 has on average a similar brightness to that of the over-exposed video signal Ie, but has much noise, and its sensitivity is significantly degraded at a low image intensity. However, although the over-exposed video signal Ie is replaced by the under-exposed video signal Is which has been amplified, actual moving pictures are not seriously affected by the sensitivity degradation and noise since they move fast. Thus, as can be seen from Equation 4, as the motion becomes slower, that is, the first motion weight Wmotion becomes smaller, the over-exposed video signal Ie is used to contribute to an improvement in sensitivity. Also, as the motion becomes faster, that is, the first motion weight Wmotion becomes greater, the amplified under-exposed video signal Ie' is used and interpolated to remove instability of an image.

When an image is picked up in a state in which the image is excessively exposed to the CCD 4, dark parts of the picked-up image become easy to recognize due to an increase in sensitivity, but an object having high luminance or bright parts of the picked-up image becomes saturated. That is, the sensitivity departs from a dynamic range and thus becomes constant, so that they are not easy to recognize. Conversely, when an image is picked up in a state in which the image is not sufficiently exposed to the CCD 4, bright parts of the picked-up image become easy to recognize due to an increase in sensitivity, but an object having low luminance or dark parts of the photographed image becomes difficult to recognize and to discriminate from noise. Therefore, the video output unit 16 in the dynamic range expanding apparatus according to the present invention interpolates and combines a low luminance portion of an over-exposed image and a high luminance portion of an under-exposed image using a first or second luminance weight Wluma or Wluma' to be described below, and thus can reproduce both the dark and bright parts of the image in good states. Accordingly, the dynamic range of an image becomes wide.

The video output unit 16 shown in FIG. 2 interpolates dark parts of a resultant signal Ie" from the motion correction unit 14 and bright parts of the under-exposed video signal Is using the first luminance weight Wluma produced from the under-exposed video signal Is, and outputs the interpolated result as an expanded video signal having an expanded dynamic range via an output port OUT1.

To achieve this, the video output unit 16 includes a first weight generator 40 and a second interpolator 42. First, the first weight generator 40 calculates the first luminance weight Wluma from the under-exposed video signal Is output by the video multiplexing unit 12, and outputs a calculated first luminance weight [Wluma(x,y)] to the second interpolator 42, the first luminance weight [Wluma(x,y)] expressed by Equation 5:

$$Wluma(x,y)=a*Is(x,y)+b \quad (5)$$

wherein a and b denote the slope and offset, respectively, of the first luminance weight [Wluma(x,y)] given from an external source.

Here, the second interpolator 42 interpolates the resultant signal Ie" from the motion correction unit 14 and the under-exposed video signal Is using the first luminance weight Wluma, and outputs the interpolated result as an expanded video signal Imdr via the output port OUT1.

The dynamic range expanding apparatus 8A according to the present invention shown in FIG. 2 includes the first and second memories 20 and 22 to calculate I(x,y,t−2) used in Equation 3.

The configurations and operations of embodiments of a dynamic range expanding apparatus according to the present invention, that can expand a dynamic range while reducing the number of memories required will now be described.

Figure 3:
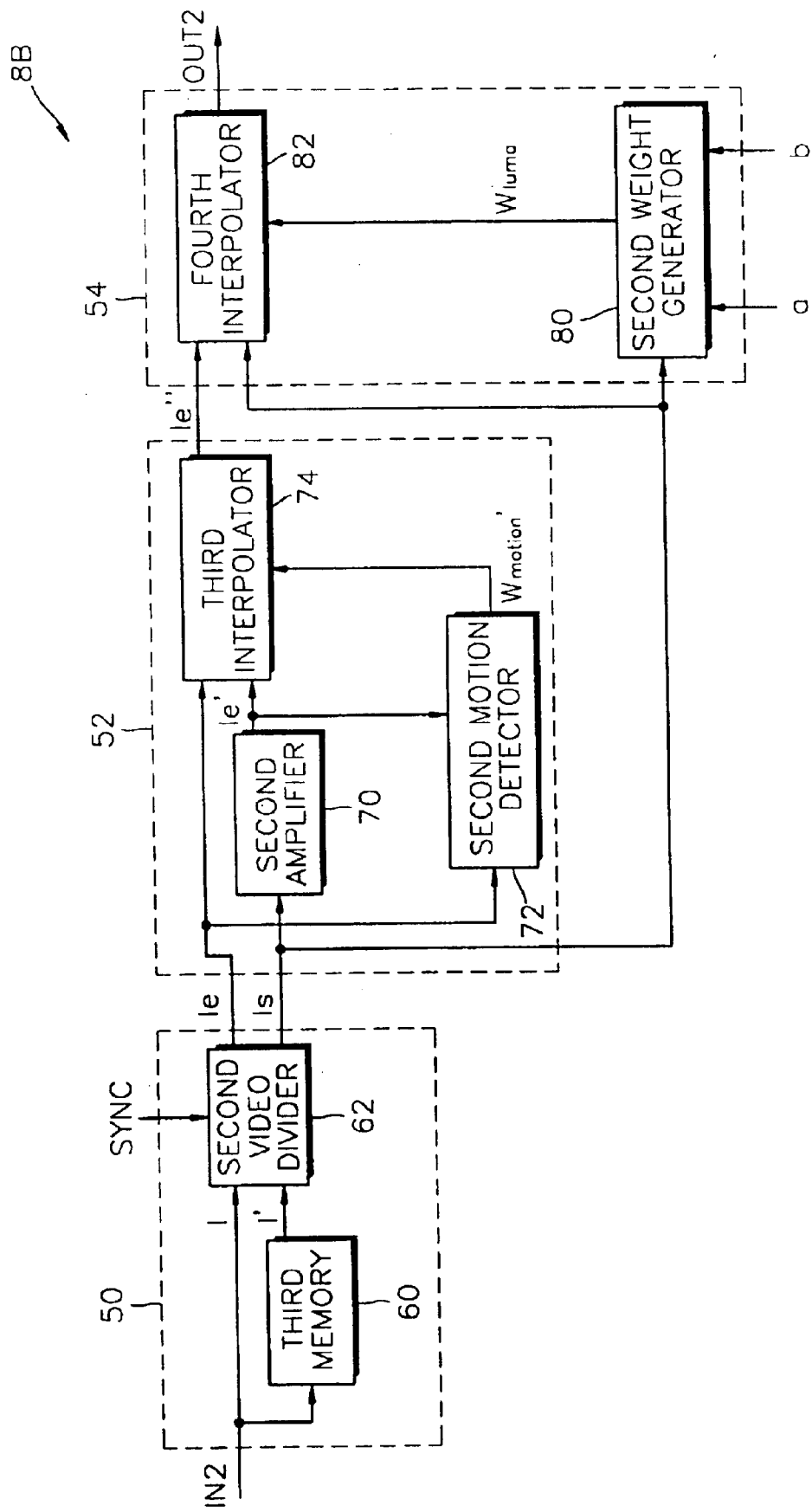
FIG. 3 is a block diagram of another embodiment of the dynamic range expanding apparatus shown in FIG. 1, in accordance with the present invention.

FIG. 3 is a block diagram of another preferred embodiment 8B of the present invention of the dynamic range expanding apparatus 8 shown in FIG. 1. The dynamic range expanding apparatus 8B includes a video multiplexing unit 50, a motion correction unit 52 and a video output unit 54 that corresponds to the video multiplexing unit 12, the motion correction unit 14, and the video output unit 16 shown in FIG. 2, respectively.

However, the configurations of the video multiplexing unit 50 and the motion correction unit 52 are different from those of the video multiplexing unit 12 and the motion correction unit 14. For example, the video multiplexing unit 50 shown in FIG. 3 includes a third memory 60 and a second video divider 62, in contrast to the video multiplexing unit 12 shown in FIG. 2. The second video divider 62 divides a digital video signal I received via an input port IN2 into an over-exposed video signal Ie and an under-exposed video signal Is in response to a field or frame synchronous signal SYNC, similar to the first video divider 24 shown in FIG. 2. Here the third memory 60 stores the digital video signal I received via the input port IN2, in units of a predetermined number of fields.

The motion correction unit 52 includes a second amplifier 70, a second motion detector 72 and a third interpolator 74. The second amplifier 70 multiplies the under-exposed video signal Is by a predetermined number (α), as shown in Equation 1, similar to the first amplifier 30 of FIG. 2. The second motion detector 72 detects a second motion weight [Wmotion(x,y)] from the over-exposed video signal Ie and the amplified signal Ie' output by the second amplifier 70, and outputs the second motion weight to the third interpolator 74, the second motion weight [Wmotion(x,y)] being expressed by Equation 6:

$$Wmotion(x,y)'=\beta 2*|Ie(x,y,t)-Ie'(x,y,t)| \quad (6)$$

wherein a second predetermined gain β2 is a specific constant for normalizing the second motion weight [Wmotion (x,y)]. The second motion weight Wmotion' is equal to or greater than 0 and smaller than 1, is a function of the amount of movement of a pixel, and is proportional to the amount of movement of a pixel, similar to the first motion weight Wmotion.

The third interpolator 74 interpolates the amplified signal Ie' from the second amplifier 70 and the over-exposed video signal Ie according to the second motion weight Wmotion', and outputs a resultant signal Ie" to the video output unit 54, the resultant signal Ie" being expressed by Equation 7:

$$Ie"=(1.0-Wmotion')*Ie +Wmotion'*Ie' \quad (7)$$

The video output unit 54 of FIG. 3 has the same structure as the video output unit 16 of FIG. 2, and performs the same function. That is, a fourth interpolator 82 of FIG. 3 performs the same function as that of the second interpolator 42 of FIG. 2, and a second weight generator 80 shown. in FIG. 3 performs the same function as that of the first weight generator 40 of FIG. 2.

Each of the output video units 16 and 54 shown in FIGS. 2 and 3 respectively, obtains a first luminance weight Wluma using external values a and b.

Figure 4:
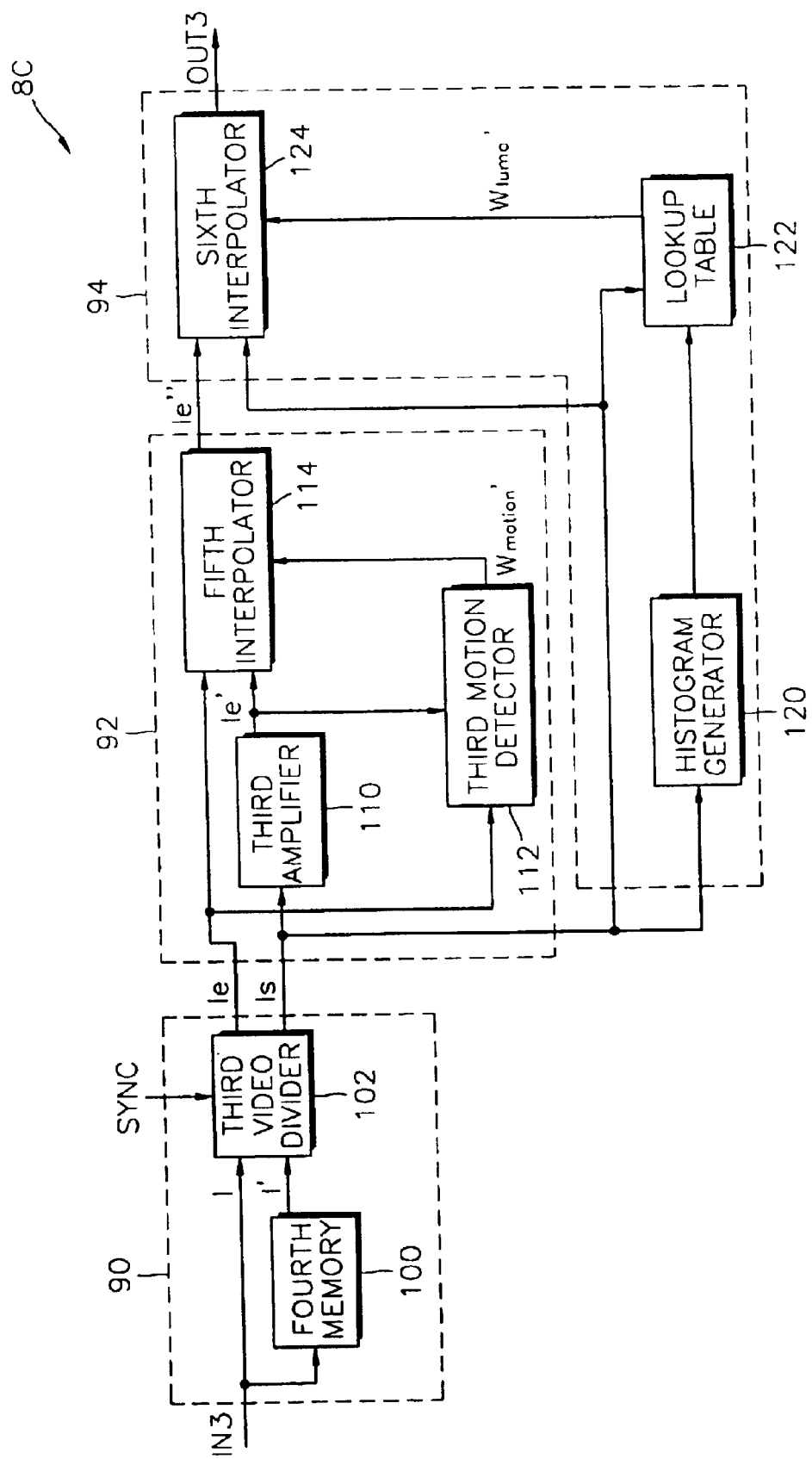
FIG. 4 is a block diagram of still another embodiment of the dynamic range expanding apparatus shown in FIG. 1, in accordance with the present invention.

FIG. 4 is a block diagram of still another embodiment 8C of the dynamic range expanding apparatus shown in FIG. 1 of the present invention. The dynamic range expanding apparatus 8C includes a video multiplexing unit 90, a motion correction unit 92, and a video output unit 94 that perform the same functions as the video multiplexing unit 12 or 50, the motion correction unit 14 or 52 and the video output unit 16 or 54, respectively. Also, the video multiplexing unit 90 and the motion correction unit 92 shown in FIG. 4 have the same configurations as the video multiplexing unit 50 and the motion correction unit 52 shown in FIG. 3, respectively. That is, a fourth memory 100, a third video divider 102, a third amplifier 110, a third motion correction unit 112 and a fifth interpolation unit 114 shown in FIG. 4 function and operate in the same way as the third memory 60, the second video divider 62, the second amplifier 70, the second motion correction unit 72 and the third interpolator 74 shown in FIG. 3, respectively, so they will not be described again.

However, the video output unit 94 shown in FIG. 4 includes a histogram generator 120, a Look Up Table (LUT) 122 and a sixth interpolator 124, in contrast to the video output unit 16 or 54 shown in FIG. 2 or 3.

The histogram generator 120 generates a histogram [h(j)] of an under-exposed video signal Is, and outputs the histogram [h(j)] to the LUT 122. The LUT 122 generates a transform function f(i) (where brightness i can be 0, 1, 2, . . . or N−1, and the maximum of brightness i is N−1) using a histogram h(j) output by the histogram generator 120, the transform function f(i) expressed by Equation 8:

$$f(i) = \frac{\sum_{0 \leq j < i} h(j)}{\sum_{0 \leq j < N} h(j)} \quad (8)$$

Then, the LUT 122 outputs one among generated transform functions as a second luminance weight Wluma' to the sixth interpolator 124, in response to an under-exposed video signal Is(x,y), which corresponds to i in a transform function, the second luminance weight Wluma' being expressed by Equation 9:

$$Wluma'(x,y)=f[Is(x,y)] \quad (9)$$

The sixth interpolator 124 interpolates the resultant signal Ie" from the motion correction unit 92 and the under-exposed video signal Is using the second luminance weight Wluma' output by the LUT 122, and outputs the interpolated result as an expanded video signal Imdr via an output port OUT3.

The dynamic range expanding apparatus 8C according to the present invention shown in FIG. 4 uses the second luminance weight Wluma' obtained by a histogram, which is a distribution of luminance levels of the under-exposed video signal Is, so that it can provide an expanded video signal Iwdr having an improved differentiation capability and resolution compared to the dynamic range expanding apparatus 8B of FIG. 3. That is, the slope of f(Is) increases, and the rate of change of f(Is) with respect to the under-exposed video signal Is also increases, in a band where many brightness values are statistically likely to be distributed within the brightness distribution of the under-exposed video signal Is, whereby an image having an improved differentiation capability can be obtained.

Finally, the dynamic range expanding apparatuses 8A, 8B or 8C according to the present invention shown in FIG. 2, 3 or 4, respectively, outputs an expanded video signal Iwdr having no motion blurring and good quality via the output port OUT1, OUT2 or OUT3, the expanded video signal Imdr being expressed by Equation 10:

$$Iwdr=(1.0-Wluma)*Ie"+Wluma*Is \text{ or } (1.0-Wluma')*Ie"+ Wluma'*Is \quad (10)$$

Figure 5:
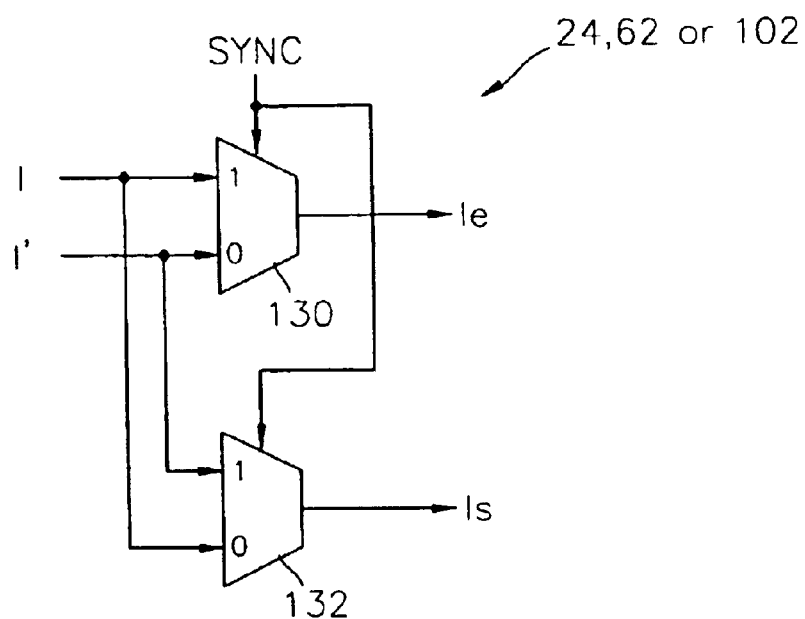
FIG. 5 is a circuit diagram of a first, second or third video divider according to an embodiment of the present invention.

FIG. 5 is a circuit diagram of the first, second or third video divider 24, 62 or 102 shown in FIG. 2, 3 or 4, respectively, according to an embodiment of the present invention. As shown in FIG. 5, the first, second or third video divider 24, 62 or 102 includes first and second multiplexers 130 and 132.

The first multiplexer 130 selects a digital video signal I received via an input port IN1, IN2 or IN3, or a digital video signal I' delayed for a predetermined number of fields and stored in the first, third or fourth memory 20, 60 or 100, in response to a field or frame synchronous signal SYNC, to obtain an over-exposed video signal Ie. At this time, the second multiplexer 132 selects one among a digital video signal I' delayed for a predetermined number of fields and stored in the first, third or fourth memory 20, 60 or 100 and a digital video signal I received via an input port IN1, IN2 or IN3, in response to a field or frame synchronous signal SYNC, to obtain an under-exposed video signal Is. Therefore, the first, second or third video divider 24, 62 or 102 can divide the digital video signal I into the over-exposed and under-exposed video signal Ie and Is.

Figure 6:
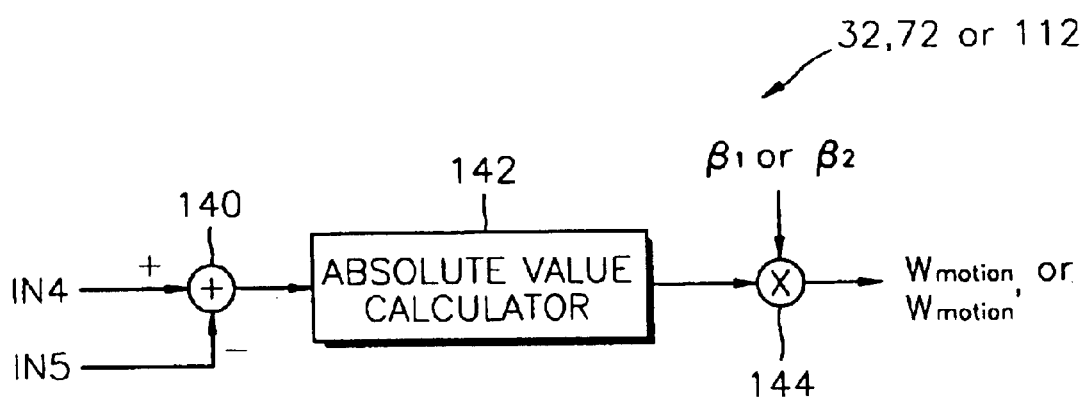
FIG. 6 is a circuit diagram of a first, second or third motion detector according to an embodiment of the present invention.

FIG. 6 is a circuit diagram of the first, second or third motion detector 32, 72 or 112 shown in FIG. 2, 3 or 4, respectively, according to an embodiment of the present invention. As shown in FIG. 6, the first, second or third motion detector 32, 72 or 112 includes a subtractor 140, an absolute value calculator 142 and a multiplexer 144.

The first, second or third motion detector 32, 72 or 112 subtracts a signal received via an input port IN5 from a signal received via an input port IN4, and outputs the result of the subtraction to the absolute value calculator 142. The absolute value calculator 142 calculates the absolute value of the output of the subtractor 140, and outputs the same to the multiplier 144. The multiplier 144 multiplies the absolute value obtained by the absolute value calculator 142 by a first or second predetermined gain β1 or β2 to output the multiplied result as a first or second motion weight Wmotion or Wmotion' to the first, third or fifth interpolator 34, 74 or 114.

For example, when the motion detector of FIG. 6 is the first motion detector 32 of FIG. 2, the subtractor 140 receives a digital video signal I(x,y,t−2) stored in the second memory 22 via the input port IN4 and receives via the input port IN5 a digital video signal I(x,y,t) received via the input port IN1, and the multiplier 144 multiplies the absolute value by a first predetermined gain β1, as shown in Equation 3. In this way, a first motion weight Wmotion is obtained and output to the first interpolator 34. On the other hand, when the motion detector of FIG. 6 is the second or third motion detector 72 or 112 shown in FIG. 3 or 4, the subtractor 140 receives an over-exposed video signal Ie via the input port IN4 and receives the output of the second or third amplifier 70 or 110 via the input-port IN5, and the multiplier 144 multiplies the absolute value by a second predetermined gain β2, as shown in Equation 6. In this way, a second motion weight Wmotion' is obtained and output to the third or fifth interpolator 74 or 114.

Figure 7:
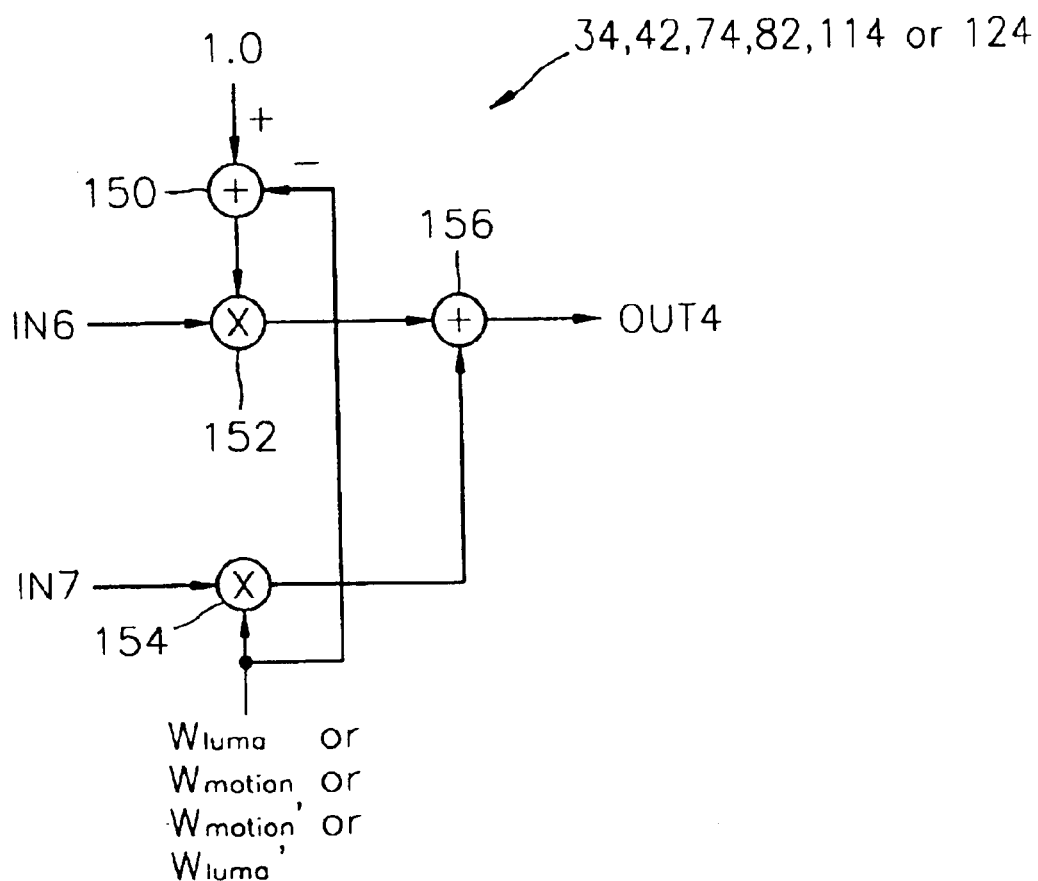
FIG. 7 is a circuit diagram of each interpolator according to an embodiment of the present invention.

FIG. 7 is a circuit diagram of each of the interpolators 34, 42, 74, 82, 114 and 124 shown in FIGS. 2 through 4, according to an embodiment of the present invention, each including a subtractor 150, multipliers 152 and 154 and an adder 156.

The multiplier 154 multiplies the output of the first, second or third amplifier 30, 70 or 110 received via the input port IN7 by the first or second motion weight Wmotion or Wmotion' or multiplies the under-exposed video signal Is received via the input port IN7 by the first or second luminance weight Wluma or Wluma', and outputs the product to the adder 156. The subtractor 150 subtracts the first or second luminance weight Wluma or Wluma' or the first or second motion weight Wmotion or Wmotion' from a predetermined value of 1.0, and outputs the result of the subtraction to the multiplier 152. The multiplier 152 multiplies the difference obtained by the subtractor 150 by the over-exposed video signal Ie or the corrected signal Ie" received via the input port IN6, and outputs the result of the multiplication to the adder 156. The adder 156 sums the products obtained by the multipliers 152 and 154 to output the added result as a corrected signal or an expanded video signal Imdr via the output port OUT4.

Figure 8:
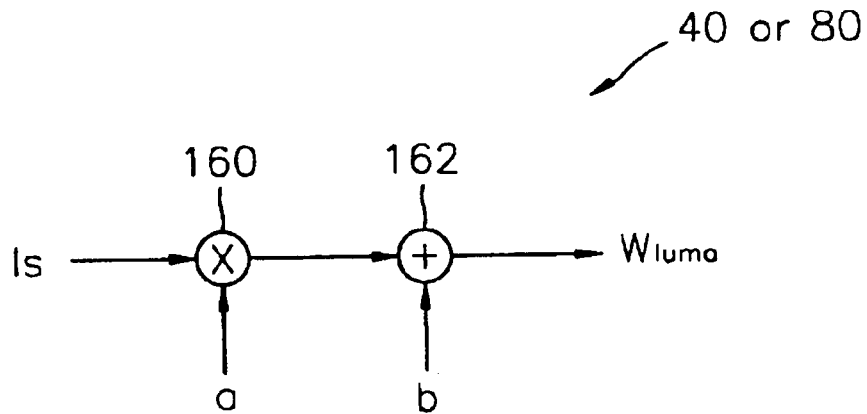
FIG. 8 is a circuit diagram of a first or second weight generator according to an embodiment of the present invention.

FIG. 8 is a circuit diagram of the first or second weight generator 40 or 80 shown in FIG. 2 or 3, according to an embodiment of the present invention. As shown in FIG. 8, the first or second weight generator 40 or 80 includes a multiplier 160 and an adder 162.

The multiplier 160 multiplies the under-exposed video signal Is by an external slope a, and outputs the product to the adder 162. The adder 162 adds an external offset b to the product obtained by the multiplier 160 to output the added result as a first luminance weight Wluma to the second or fourth interpolator 42 or 82.

A dynamic range expanding method for an image processing system according to the present invention, which is performed by the above-described dynamic range expanding apparatus, will now be described with reference to the attached drawings.

Figure 9:
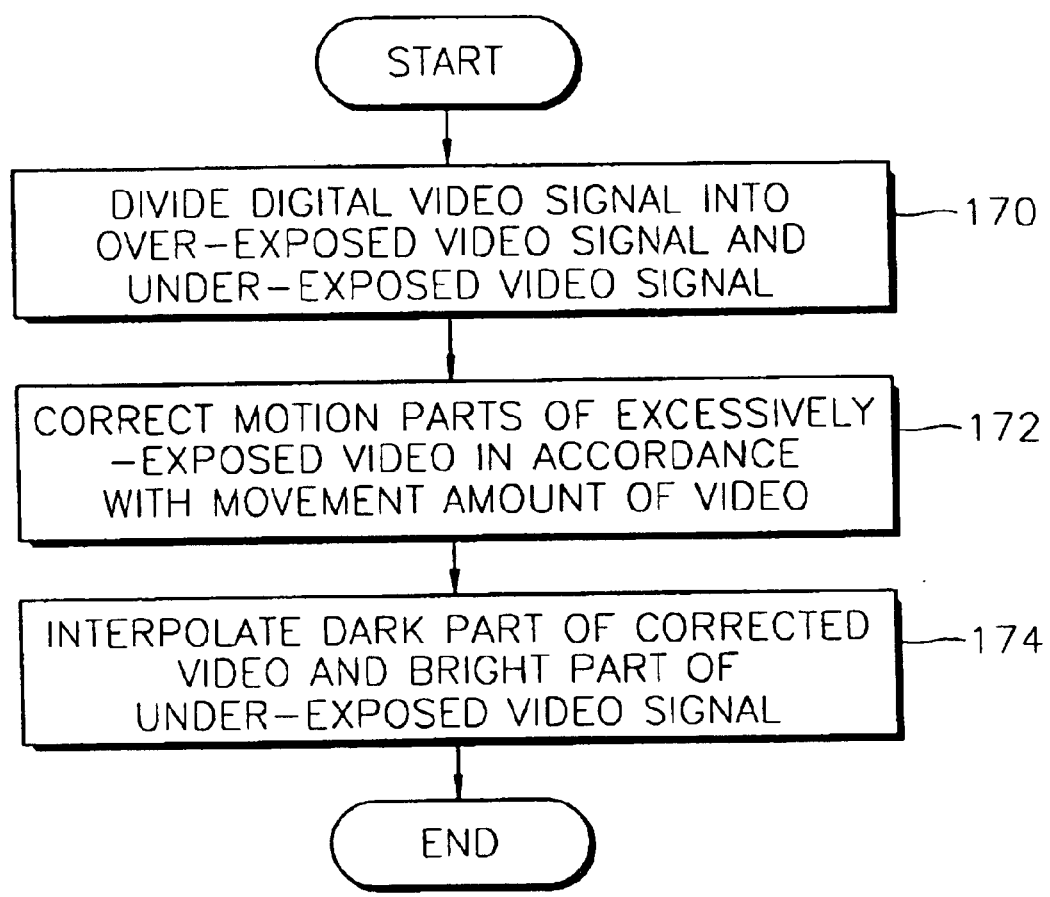
FIGS. 9 and 10 are flowcharts illustrating a dynamic range expanding method performed by a dynamic range expanding apparatus according to an embodiment of the present invention.

FIG. 9 is a flowchart illustrating a dynamic range expanding method which can be performed by the dynamic range expanding apparatus of FIG. 2, 3 or 4 according to the present invention. This method is made up of steps 170, 172 and 174 for expanding the dynamic, range of a digital video signal I having two exposure levels.

As described above, the video multiplexing unit 12, 50 or 90 in the dynamic range expanding apparatus 8A, 8B or 8C shown in FIG. 2, 3 or 4, respectively, divides the digital video signal I output by the ADC 6 into an over-exposed video signal Ie and an under-exposed video signal Is having different exposure levels, in step 170. Next, the motion corrector 14, 52 or 92 in the apparatus 8A, 8B or 8C corrects moving parts of an excessively-exposed video according to the motion amount of an image acquired by the CCD 4, in step 172.

Figure 10:
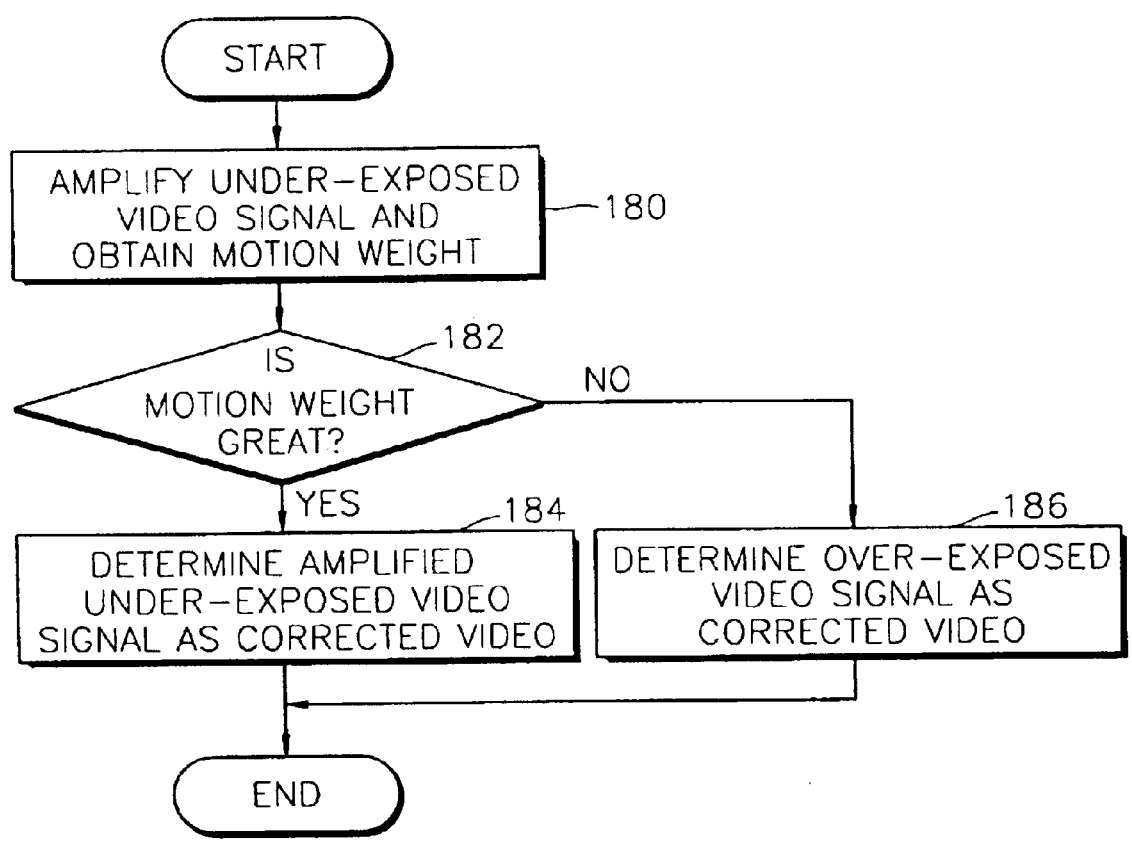

FIG. 10 is a flowchart illustrating step 172 shown in FIG. 9 in greater detail. The step 172 is made up of steps 180 through 186 for determining a motion-corrected signal according to the motion weight of a video.

Referring to FIG. 10, the first, second or third amplifier 30, 70 or 110 in the motion corrector 14, 52 or 92, respectively, amplifies the under-exposed video signal Is, and the first, second or third motion detector 32, 72 or 112 obtains a first or second motion weight Wmotion or Wmotion', in step 180. That is, the first motion detector 32 in the apparatus of FIG. 2 amplifies the difference between the first digital video signal I and the digital. video signal I' delayed for a predetermined number of fields, to thereby obtain the first motion weight Wmotion. The second or third motion detector 72 or 112 in the apparatus of FIG. 3 or 4, respectively, amplifies the difference between the over-exposed video signal Ie and the amplified under-exposed video signal Ie' to obtain the second motion weight Wmotion'.

After the step 180, the first, third or fifth interpolator 34, 74 or 114 determines whether the first or second motion weight Wmotion or Wmotion' is great, in step 182. That is, whether the motion of a video is fast or slow is determined. The first, third or fifth interpolator 34, 74 or 114 determines the amplified under-exposed video signal Ie' from the step 180 to be the final corrected result of the step 172, in step 184, if the first or second motion weight Wmotion or Wmotion' is great, that is, if the motion is fast. On the other hand, if the first or second motion weight Wmotion or Wmotion' is small, the over-exposed video signal Ie is determined to be the final corrected result of the step 172, in step 186.

In the meantime, dark parts of the corrected signal Ie" of the step 172 and bright parts of the under-exposed video signal Is are interpolated using the first or second luminance weight Wluma or Wluma' produced from the under-exposed video signal Is, and the result of the interpolation is determined to be an expanded video signal Iwdr having an expanded dynamic range, in step 174.

As described above, in a dynamic range expanding apparatus and method in an image processing system according to the present invention, a dynamic range can be more stably expanded by removing motion blur caused when images each having two different exposure levels are combined.

While this invention has been particularly shown and described with references to preferred embodiments thereof, it will be understood by those skilled in the art that various changes in form and details may be made therein without departing from the spirit and scope of the invention as defined by the following claims.

What is claimed is:

1. A dynamic range expanding apparatus in an image processing system for converting an analog video signal output from a charge coupled device into a digital video signal and expanding the dynamic range of the digital video signal, the apparatus comprising:
   a video multiplexing unit for dividing the digital video signal into an over-exposed video signal and an under-exposed video signal having different exposure levels;
   a motion correction unit for correcting the moving part of an excessively-exposed video according to the amount of movement of an image acquired by the charged coupled device, using the output of the video multiplexing unit; and
   a video output unit for interpolating a dark part of a resultant signal corrected by the motion correction unit and a bright part of the under-exposed video signal using a luminance weight produced from the under-exposed video signal, and for outputting the interpolated result as an expanded video signal having an expanded dynamic range.

2. The dynamic range expanding apparatus of claim 1, wherein the video multiplexing unit comprises:
   a first video divider for dividing the digital video signal into the over-exposed video signal and the under-exposed video signal;
   a first memory for storing the digital video signal in units of a predetermined number of fields; and
   a second memory for storing the result stored in the first memory in units of the predetermined number of fields.

3. The dynamic range expanding apparatus of claim 2, wherein the motion correction unit comprises:
   a first amplifier for amplifying the under-exposed video signal by a predetermined factor;
   a first motion detector for detecting a first motion weight that corresponds to the amount of movement of the image from the resultant signal stored in the second memory and the digital video signal; and
   a first interpolator for interpolating a signal amplified by the first amplifier and the over-exposed video signal according to the first motion weight and for outputting the interpolated result as the resultant signal corrected by the motion correction unit.

4. The dynamic range expanding apparatus of claim 3, wherein the first motion detector comprises:
   a first subtractor for subtracting the digital video signal from the signal stored in the second memory;
   a first absolute value calculator for calculating the absolute value of the output of the first subtractor; and
   a first multiplier for multiplying the absolute value output by the first absolute value calculator by a first predetermined gain to obtain the first motion weight.

5. The dynamic range expanding apparatus of claim 3, wherein the first or second interpolator comprises:
   a third multiplier for multiplying an amplified signal output by the first or second amplifier by the first or second motion weight;
   a third subtractor for subtracting the first or second motion weight from a predetermined value;
   a fourth multiplier for multiplying the result of the subtraction by the third subtractor by the over-exposed video signal; and
   an adder for adding the product of the multiplication by the fourth multiplier to the product of the multiplication by the third multiplier and for outputting the added result as the resultant signal corrected by the motion correction unit.

6. The dynamic range expanding apparatus of claim 1, wherein the video multiplexing unit comprises:
   a second video divider for dividing the digital video signal into the over-exposed video signal and the under-exposed video signal; and
   a third memory for storing the digital video signal in units of a predetermined number of fields.

7. The dynamic range expanding apparatus of claim 6, wherein the motion correction unit comprises:
   a second amplifier for amplifying the under-exposed video signal by a predetermined factor;
   a second motion detector for detecting a second motion weight that corresponds to the amount of movement of the image from the over-exposed video signal and the resultant signal amplified by the second amplifier; and
   a second interpolator for interpolating a signal amplified by the second amplifier and the over-exposed video signal according to the second motion weight and for outputting the interpolated result as the resultant signal corrected by the motion correction unit.

8. The dynamic range expanding apparatus of claim 7, wherein the second motion detector comprises:
   a second subtractor for subtracting the amplified signal output by the second amplifier from the over-exposed video signal;
   a second absolute value calculator for calculating the absolute value of the output of the second subtractor; and
   a second multiplier for multiplying the absolute value output by the second absolute value calculator by a second predetermined gain to obtain the second motion weight.

9. The dynamic range expanding apparatus of claim 7, wherein the first or second interpolator comprises:
   a third multiplier for multiplying an amplified signal output by the first or second amplifier by the first or second motion weight;
   a third subtractor for subtracting the first or second motion weight from a predetermined value;
   a fourth multiplier for multiplying the result of the subtraction by the third subtractor by the over-exposed video signal; and
   an adder for adding the product of the multiplication by the fourth multiplier to the product of the multiplication by the third multiplier and for outputting the added result as the resultant signal corrected by the motion correction unit.

10. The dynamic range expanding apparatus of claim 1, wherein the video output unit comprises:
    a weight generator for generating the luminance weight from the under-exposed video signal; and
    a third interpolator for interpolating the output of the motion correction unit and the under-exposed video signal using the luminance weight and for outputting the interpolated result as the expanded video signal.

11. The dynamic range expanding apparatus of claim 1, wherein the video output unit comprises:
    a histogram generator for generating the histogram of the under-exposed video signal;
    a Look Up Table for storing transform functions produced in response to the histogram and outputting one among the stored transform functions as the luminance weight in response to the under-exposed video signal; and
    a fourth interpolator for interpolating the output of the motion correction unit and the under-exposed video signal using the luminance weight output by the Look Up Table and for outputting the interpolated result as the expanded video signal.

12. A dynamic range expanding method in an image processing system for converting an analog video signal output from a charge coupled device into a digital video signal and expanding the dynamic range of the digital video signal, the method comprising:
    (a) dividing the digital video signal into an over-exposed video signal and an under-exposed video signal having different exposure levels;
    (b) correcting the moving part of an excessively-exposed video according to the amount of movement of an image acquired by the charged coupled device; and
    (c) interpolating a dark part of a resultant signal corrected in the step (b) and a bright part of the under-exposed video signal using a luminance weight produced from the under-exposed video signal to determine the interpolated result as an expanded video signal having an expanded dynamic range.

13. The dynamic range expanding method of claim 12, wherein the step (b) comprises:

(b1) amplifying the under-exposed video signal and the difference between the digital video signal and the digital video signal delayed for a predetermined number of fields, to obtain a first motion weight that corresponds to the amount of movement of an image;

(b2) determining whether the first motion weight is great;

(b3) determining the under-exposed video signal amplified in the step (b1) to be a corrected signal obtained through the step (b), if the first motion weight is great; and (b4) determining the over-exposed video signal to be a corrected signal obtained through the step (b), if the first motion weight is small.

14. The dynamic range expanding method of claim 12, wherein the step (b) comprises:

(b5) amplifying the under-exposed video signal and the difference between the over-exposed video signal and the amplified under-exposed video signal, to obtain a second motion weight that corresponds to the amount of movement of an image;

(b6) determining whether the second motion weight is great;

(b7) determining the under-exposed video signal amplified in the step (b5) to be a corrected signal output from the step (b), if the second motion weight is great; and (b8) determining the over-exposed video signal to be a corrected signal obtained through the step (b), if the second motion weight is small.

* * * * *